United States Patent [19]
Choi

[11] Patent Number: 5,369,564
[45] Date of Patent: Nov. 29, 1994

[54] PHASE-DIFFERENCE SYNCHRONIZATION CONTROLLING CIRCUIT OF PARALLEL SWITCHING MODE POWER SUPPLY

[75] Inventor: Seung Choi, Suwon, Rep. of Korea
[73] Assignee: SamSung Electronics Co., Ltd., Suwon, Rep. of Korea
[21] Appl. No.: 64,471
[22] Filed: May 20, 1993
[30] Foreign Application Priority Data
  May 21, 1992 [KR] Rep. of Korea .................. 1992-8608
[51] Int. Cl.⁵ .......................................... H02M 3/335
[52] U.S. Cl. ...................................... 363/71
[58] Field of Search .................. 363/20, 21, 41, 65, 363/71, 72, 97, 131

[56] References Cited
U.S. PATENT DOCUMENTS

| | | | |
|---|---|---|---|
| 4,661,897 | 4/1987 | Pitel | 363/71 |
| 4,825,144 | 4/1989 | Alberkrack et al. | 363/71 |
| 5,008,795 | 4/1991 | Parsley et al. | 363/71 |
| 5,130,561 | 7/1992 | Elliott et al. | 363/72 |
| 5,142,468 | 8/1992 | Nerem | 363/71 |

Primary Examiner—Steven L. Stephan
Assistant Examiner—Matthew Nguyen
Attorney, Agent, or Firm—Robert E. Bushnell

[57] ABSTRACT

A power circuit of SMPS (Switching Mode Power Supply) is disclosed. Particularly, a phase-difference synchronization controlling circuit of a power circuit for operating in parallel two or more SMPSs is disclosed. The phase-difference synchronization controlling circuit comprises a first PWM controller, a second PWM controller, phase-difference synchronization controlling means connected between an output terminal of the first PWM controller and an output control terminal of the second PWM controller, first and second transformers whose one-sided ends of respective primary windings are connected to a supply voltage Vdc, and first and second switching transistors and coupled between the first and second transformers and a ground. By the above constitution, the output phases of two power circuits are synchronized, and at the same time, PWM pulses are alternatively outputted with a phase difference of 180°, so that two power supplies can be operated in parallel with DC power source supplied from a power source supplier of small capacity.

8 Claims, 3 Drawing Sheets

PHASE-DIFFERENCE SYNCHRONIZATION CONTROLLING CIRCUIT OF PARALLEL SWITCHING MODE POWER SUPPLY

BACKGROUND OF THE INVENTION

The present invention relates to a power circuit of SMPS (Switching Mode Power Supply) and more particularly to a phase-difference synchronization controlling circuit of a power circuit which operates two or more SMPSs in parallel.

Generally, when circuits having different operation output voltage levels are operated in parallel, one or more power supplies should be operated in parallel with respect to one input.

To operate two circuits being respectively supplied with a power source of different levels, two power supplies are used. For example, SMPS operated with at least two or more power circuits having a PWM (pulse width modulation) device is used.

When two power circuits are operated in parallel within a SMPS having two or more power circuits, new higher harmonics are generated by the power source switching frequency difference between two power circuits, thereby affecting the operation of the power circuit.

To prevent generation of higher harmonics due to the switching frequency difference of two power circuits during parallel-operation of two power circuits, the method of phase-synchronizing the outputs of the PWM pulse generators in the respective insides of the two power circuits is used. The circuit for this method is described in FIG. 1.

FIG. 1 is a conventional parallel power circuit diagram of SMPS, which comprises a power source filter 10 for removing noise included in an input DC supply voltage Vdc and outputting the noise-removed voltage, a first controller 14 for outputting a predetermined PWM pulse having a predetermined period and a clock synchronized to the PWM pulse, in response to an input of a DC voltage Vdc outputted from the power source filter 10, a second PWM controller 16 for generating a predetermined PWM pulse having a predetermined period in response to an input of the DC voltage, and outputting the generated PWM pulse with being phase-synchronized to a clock outputted from the first PWM controller 14, first and second transformers 18 and 20 whose one-sided ends of primary windings n11 and n21 are connected to the supply voltage Vdc, for induced-outputting the voltage inputted to the primary windings n11 and n21 to respective secondary windings n12 and n22, first and second switching transistors 22 and 24 coupled between the other terminals of the primary windings n11 and n21 of the first and second transformers 18 and 20, for driving the first and second transformers 18 and 20 by being switched with the PWM pulses respectively outputted from the first and second PWM controllers 14 and 16, and rectifying portions 26 and 28 for rectifying and outputting the pulse voltages outputted from the respective secondary windings n12 and n22 of the first and second transformers 18 and 20.

The first and second PWM controllers 14 and 16 in the constitution of FIG. 1 are connected to components of resistor and capacitor for determining an internal oscillation time constant.

FIGS. 2A to 2C are operational waveform diagrams for explaining the operation of FIG. 1, in which FIGS. 2A and 2B are waveform diagrams of currents flowing in the primary windings n11 and n21 of the first and second transformers 18 and 20, and FIG. 2C is a current waveform diagram of the input supply voltage Vdc when the first and second transformers 18 and 20 are driven as shown in FIGS. 2A and 2B.

If a DC voltage Vdc is now supplied to the circuit of FIG. 1, the input filter 10 removes a noise of the input supply voltage Vdc, which is supplied to one-sided terminals of the respective primary windings n11 and n21 of the first and second transformers 18 and 20 and to the power lines 32 and 34 of the first and second PWM controllers 14 and 16.

At this time, the first PWM controller 14 supplies the predetermined PWM pulse 37 through the line 36 to the base of the transistor 22 and at the same time, supplies a clock having the same period as that of the outputted PWM pulse 37 through the line 30 to the second PWM controller 16, in response to an input of the voltage Vdc outputted from the filter 10.

Meanwhile, the second PWM controller 16 generates a PWM pulse of a predetermined time constant in response to the input of the supply voltage Vdc outputted from the filter 10, and synchronizes the generated PWM pulse to the clock inputted through the line 30 and outputs the PWM pulse 39 generated in its inside to the line 38. Accordingly, the second PWM controller 16 outputs the PWM pulse synchronized to the clock outputted from the first PWM controller 14, so that the PWM pulses 37 and 39 outputted from the first and second PWM controllers 14 and 16 are outputted with the same frequency.

The first and second transistors 22 and 24 for receiving the PWM pulses 37 and 39 respectively outputted from the first and second PWM controllers 14 and 16 in their base terminals through the lines 36 and 38 are switched according to input periods of the PWM pulses 37 and 39.

If the first and second transistors 22 and 24 are switched "on", the current of the supply voltage Vdc received in one-sided terminals of the primary windings n11 and n21 of the first and second transformers 18 and 20 flows through the respective collector-emitter. That is, if the two transistors 22 and 24 are switched "on", respective current loops of primary windings n11 and n21 of the first and second transformers 18 and 20 are formed, thereby respectively flowing currents i1 and i2.

At this time, if it is assumed that the PWM pulses 36 and 38 respectively outputted from the first and second PWM controllers 14 and 16 have frequencies having the same phase, and an on/off duty ratio is 50%, the currents i1 and i2 respectively flowing in the primary windings n11 and n21 of the first and second transformers 18 and 20 become those of FIGS. 2A and 2B.

Accordingly, in the SMPS having the above constitution shown in FIG. 1, the two power circuits are operated with the same frequency as described above, thereby preventing higher harmonics generated in parallel operation of two SMPSs.

However, because the frequencies of PWM pulses outputted from the first and second PWM controllers 14 and 16 are equal, currents of the primary windings respectively flow in the primary windings of the first and second transformers 18 and 20 at the same time, so that the circuit in FIG. 1 should be supplied with a DC input as much as the amount of summed current.

That is, since the phases of the PWM pulses outputted from the two PWM controllers 14 and 16 are equal, the current I, i.e., a sum i1+i2 of currents i1 and i2 flowing in the primary windings n11 and n21 of the first and second transformers 18 and 20 as shown in FIG. 2C should be supplied to the input filter 10.

Accordingly, the power circuit of FIG. 1 generates a problem in that the power supplier for supplying a DC supply voltage Vdc shown in FIG. 1 should have large capacity because of an increase in currents consumed in the two transformers 18 and 20.

SUMMARY OF THE INVENTION

Accordingly, it is an object of the present invention to provide a power supply in which operation of two power supplies is done with a phase difference of 180° when the two power supplies are operated in parallel.

It is another object of the present invention to provide a circuit controlled by the output of one power supply between two power supplies, thereby controlling the two power supplies alternatively operated.

BRIEF DESCRIPTION OF THE DRAWINGS

The above objects and other advantages of the present invention will become more apparent by describing the preferred embodiment of the present invention with reference to the attached drawings, in which.

DETAILED DESCRIPTION OF THE INVENTION

Figure 3:
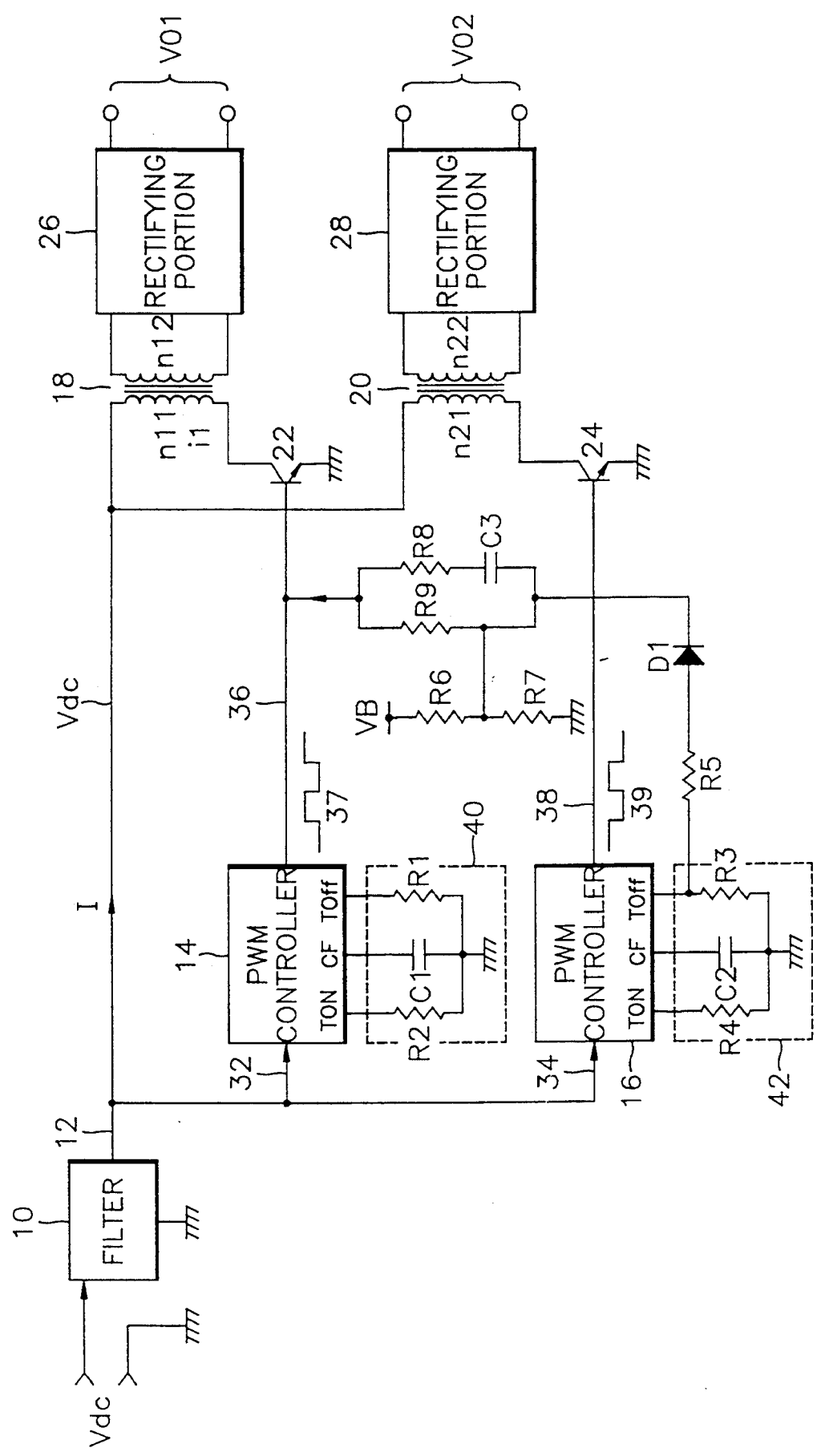
FIG. 3 is a phase-difference synchronization circuit of parallel SMPS according to the present invention.

FIG. 3 is a diagram showing a phase-difference synchronization controlling circuit of a parallel-operated SMPS according to the present invention, which comprises a power source filter 10 for removing a noise included in an input DC supply voltage Vdc and outputting the noise-removed voltage, a first PWM controller 14 for outputting a predetermined PWM pulse having a predetermined period in response to an input of DC voltage outputted from the power source filter 10, a second PWM controller 16 operated by an input of the DC voltage Vdc and outputting a predetermined PWM pulse having a predetermined period in response to an input of a pulse output controlling signal, a phase-difference synchronization controlling means coupled between an output terminal of the first PWM controller 14 and an output control terminal of the second PWM controller 16, for detecting a first state voltage of a PWM pulse outputted from the first PWM controller 14 and outputting an output controlling signal to the second PWM controller 16, first and second transformers 18 and 20 whose one-sided ends of primary windings n11 and n12 are respectively connected to the supply voltage Vdc, for induced-outputting a voltage inputted to the primary windings n11 and n21 to respective secondary windings n12 and n22, first and second switching transistors 22 and 24 coupled between the other ends of primary windings n11 and n21 of the first and second transformers 18 and 20, for driving the first and second transformers 18 and 20 by being switched to PWM pulses respectively outputted from the first and second PWM controllers 14 and 16, and a rectifying portions 26 and 28 for rectifying and outputting pulse voltages outputted from respective secondary windings n12 and n22 of the first and second transformers 18 and 20.

In the constitution such as FIG. 3, the phase-difference synchronization controlling means comprises a resistor R5, a diode D1, resistors R6 through R9, and a capacitor C3, connected between an output control terminal of the second PWM controller 16 and an output terminal of the first PWM controller 14.

Figure 1:
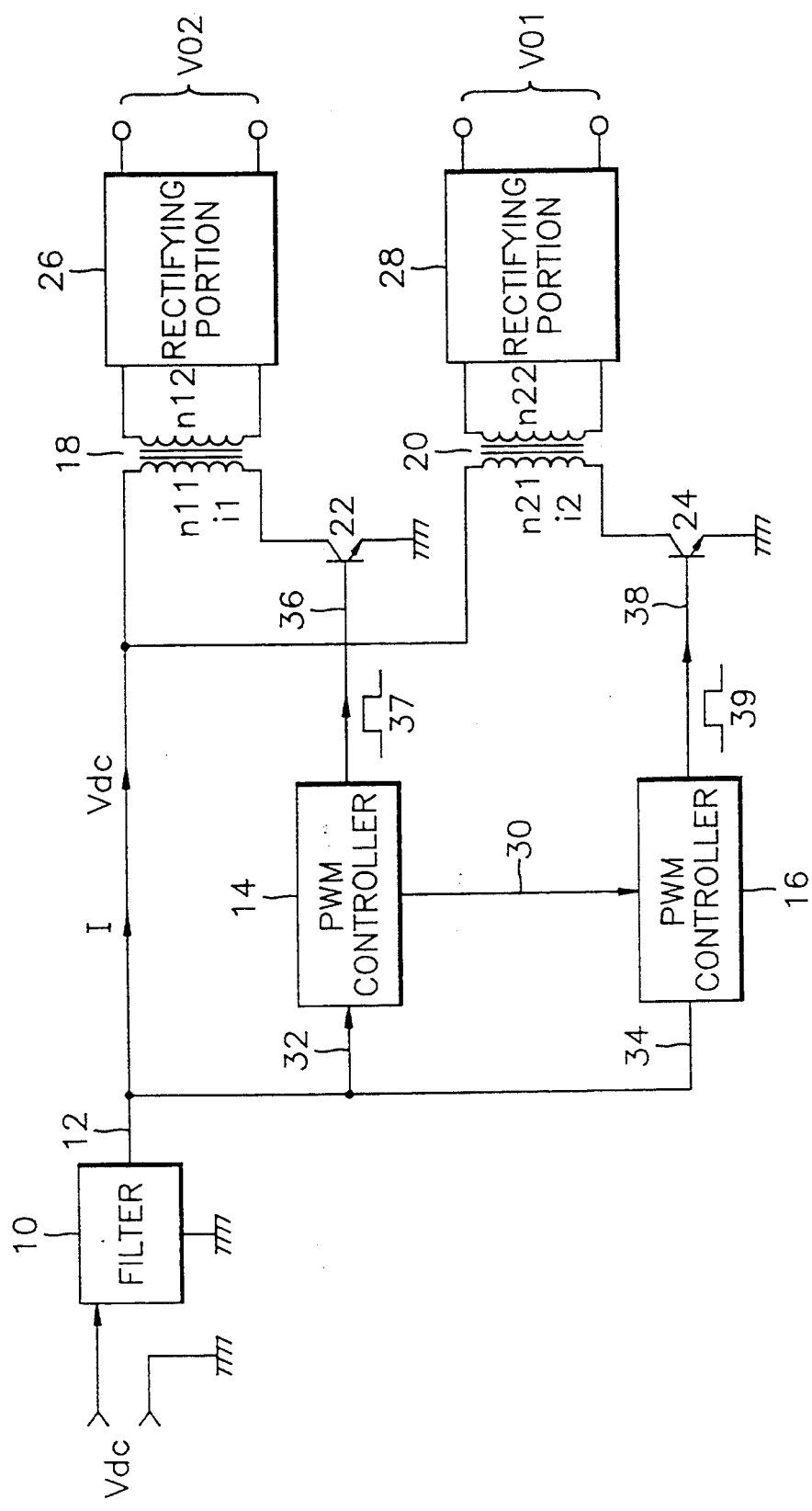
FIG. 1 is a conventional parallel power circuit of SMPS.
Figure 2A:
FIGS. 2A to 2C are waveform diagrams for explaining the operation of FIG. 1.
Figure 2B:
Figure 2C:
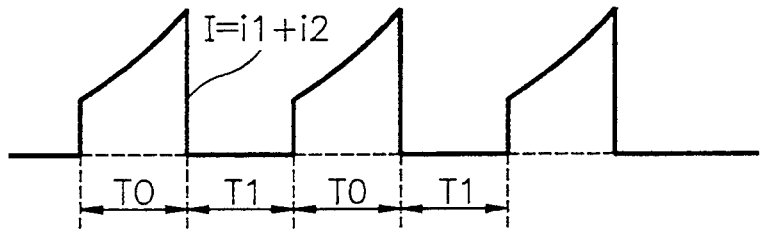

Unexplained numerals 40 and 42 represent RC time constant circuits for determining oscillation frequencies of the first and second PWM controllers 14 and 16. Portions in FIG. 3 having the same function (operation) as those in FIG. 1 use the same numerals as in FIG. 1.

Figure 4A:
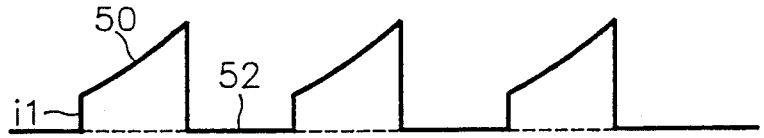
FIGS. 4A to 4C are a waveform diagrams for explaining the operation of FIG. 3.
Figure 4B:
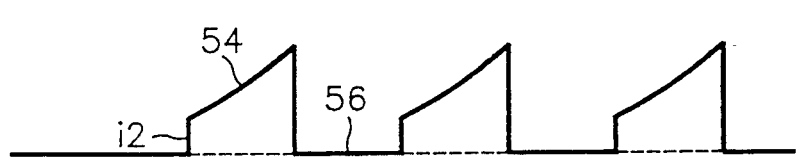
Figure 4C:
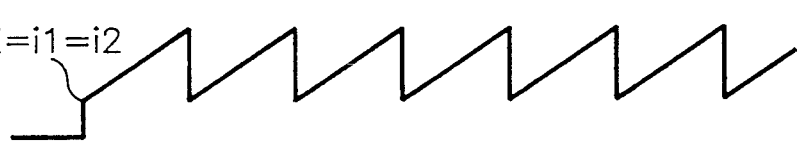

FIGS. 4A to 4C show operational waveform diagrams for explaining the operation of FIG. 3, where FIGS. 4A and 4B are waveform diagrams of currents flowing in respective primary windings n11 and n21 of the first and second transformers 18 and 20, and FIG. 4C is a current waveform diagram of an input supply voltage Vdc.

Before explaining the operational embodiment of FIG. 3 according to the present invention with reference to FIG. 3, it is assumed that the respective first and second PWM controllers 14 and 16 output PWM pulses when RC time constant terminals Toff become "low".

If a DC supply voltage Vdc and a voltage VB are respectively supplied to the filter 10 and the resistor R6 in the circuit of FIG. 3, the input filter 10 removes noise included in the input supply voltage Vdc by filtering-operation as described above. The supply voltage Vdc whose noise is removed in the filter 10 is inputted to power lines 32 and 34 of the first and second PWM controllers 14 and 16 and to one-sided terminals of primary windings n11 and n21 of the first and second transformers 18 and 20 as described above.

At this time, the first PWM controller 14 outputs a PWM pulse 37 having an oscillation frequency according to a RC value of the time constant circuit 40 through a line 36 to the base of the first transistor 22 and to a filter circuit composed of resistors R6 through R9 and the capacitor C3, in response to the input of the DC power source Vdc.

The first transistor 22 is switched "on" in response to the PWM pulse 37 outputted from the first PWM controller 14 in a second state, for example, in a logic "high" state, and is switched "off" in response to a first state (a logic "low").

Accordingly, if the on/off period of PWM pulse 37 outputted from the first PWM controller 14 is that of FIG. 4A, the first transistor 22 switched "on/off" with the period such as FIG. 4A. If the first transistor 22 is switched "on/off", a current loop according to the "on/off" period is formed in the primary winding n11 of the first transformer 18, thereby flowing the current i1 such as FIG. 4A into the primary winding n11.

Meanwhile, the second PWM controller 16 generates a PWM pulse of an oscillation frequency set by the RC time constant circuit 42 in response to the DC voltage Vdc inputted through the line 34, and supplies the generated PWM pulse to the base of the second transistor 24 through the output line 38 when the level of terminal Toff is "low".

At this time, the terminal Toff of the second PWM controller 16 is controlled by being synchronized to the first state of the PWM pulse 37 outputted from the first PWM controller 14.

If the PWM pulse outputted from the first PWM controller 14 is in a second state level (logic "high") such as 50 of FIG. 4A, the second state level is supplied to the cathode of the diode D1 through the resistor R9, thereby cutting off the diode D1.

Accordingly, if the output of the first PWM controller 14 is a pulse in a "high" state such as 50 of FIG. 4A, the terminal Toff of the second PWM controller 16 maintains "high" level, thereby not outputting the PWM pulse 39 to the output line 38. If the output of the first PWM controller 14 is in "low" state such as 52 of FIG. 4A, the "high" level voltage at the terminal Toff of the second PWM controller 16 flows to the output terminal of the first PWM controller 14 through the resistor R5, the diode D1, and the resistor R9, thereby becoming a "low" level.

At this time, the "high" level of terminal Toff of the second PWM controller 16 flows along the above path, because the output terminals of the two PWM controllers 14 and 16 are open-collectors.

If the level at the terminal Toff of the second PWM controller 16 becomes "low" as described above, the second PWM 16 supplies a PWM pulse such as 54 of FIG. 4B to the base of the second switching transistor 24. At this time, since the second transistor 24 is switched "on", the current i2 such as 54 of FIG. 4B flows in the primary winding n21 of the second transformer 20.

During the above operation, if the output pulse of the first PWM controller 14 becomes again "high", the diode D1 is cut off as described above. Accordingly, the output of the second PWM controller 16 is blocked, so that it can be known that the second PWM controller 16 is phase-difference synchronized to the "low" output of the first PWM controller 14, thereby outputting a PWM pulse.

The resistors R8 and R9 and the capacitor C3 in FIG. 3 constitute a filter circuit for operating the potential of terminal Toff of the second PWM controller 16 only in a moment, and the resistors R6 and R7 constitute a pull-up and pull-down circuit for ensuring the potential of circuit during the operation of circuit.

Also, the resistor R5 and the diode D1 prevents an excessive potential drop at the terminal Toff of the second PWM controller 16, and blocks inverse potential, etc., which can be induced from the voltage VB or the output pulse 37.

As described above, according to the present invention, the operation of the second PWM controller 16 is started by detecting the "low" level signal among the output signals of the first PWM controller 14, so that the operation of the second PWM controller 16 is started in a phase less than 180° after the operation of the first PWM controller 14.

Accordingly, the currents alternatively flow in the primary windings n11 and n21 of the first and second transformers 18 and 20 by the protective switching operation of the first and second transistors 22 and 24, so that the input current waveform such as FIG. 4C is obtained.

Accordingly, since it is needed that the current of the input voltage has only the magnitude of consumed current of the first and second transformers 18 and 20, the circuit of FIG. 3 can be operated with a power supplier having small capacity.

In an embodiment of the present invention, the output of the second PWM controller 16 is controlled with the output of the first PWM controller 14, using the circuit composed of a diode D1, a plurality of resistors, a capacitor, etc. Moreover, the output state of the second PWM controller 16 can be also controlled by detecting a "low" signal outputted from the first PWM controller 14.

As described above, according to the present invention, parallel operation of two or more SMPSs, output phases are synchronized to one SMPS. That is, the other SMPS is operated with being dependent on the main SMPS, thereby being alternatively operated. Accordingly, the efficiency of input power source of SMPS can be increased.

What is claimed is:

1. A switching mode power circuit, comprising:
an input terminal for receiving a single DC voltage;
first and second pulse generating means coupled to said input terminal for generating first and second pulses, respectively, having first and second pulse widths in response to said DC voltage;
first generating means coupled between said input terminal and an output terminal of said first pulse generating means for generating a first DC supply voltage according to a switching operation of said first pulse having said first pulse width;
second generating means coupled between said input terminal and an output terminal of said second pulse generating means for generating a second DC supply voltage according to a switching operation of said second pulse having said second pulse width;
a first resistor having an input terminal and an output terminal, said input terminal of said first resistor for receiving a voltage potential;
a second resistor having a first terminal for receiving a second potential and having a second terminal attached to said output terminal of said first resistor at a first connecting point;
an R-C circuit having a plurality of resistors and a capacitor, said R-C circuit connected to said first and second resistors at said first connecting point and coupled to said output terminal of said first pulse generating means;
a third resistor having an input terminal and an output terminal, said input terminal of said third resistor coupled to said control terminal of said second pulse generating means; and
a diode having an input terminal and an output terminal, said input terminal of said diode connected to said output terminal of said third resistor and said output terminal of said diode coupled to said R-C circuit.

2. A phase-difference synchronization controlling circuit of parallel switching mode power supply having a DC supply voltage of a predetermined level, first and second transformers whose one-sided ends of respective primary windings are connected to said supply voltage, for reduced-outputting a voltage inputted to said primary windings to respective secondary windings, and first and second switching means coupled between other ends of said primary windings of said first and second transformers and a ground, for driving said first and second transformers by being switched with pulse width modulation pulses respectively outputted from said first and second pulse width modulation controllers, comprising:
a power source filter for removing noise included in said DC supply voltage and outputting a noise-removed DC supply voltage;

a first pulse width modulation controller for outputting a predetermined pulse width modulation pulse having a predetermined period as a control signal of said first switching means in response to an input of DC voltage outputted form said power source filter;

phase-difference synchronization controlling means for detecting a first state voltage of a pulse width modulation pulse outputted from said first pulse width modulation controller and outputting a second state voltage output controlling signal;

a second pulse width modulation controller being operated by an input of said DC voltage, for outputting a predetermined pulse width modulation pulse of a second state voltage having a predetermined period as a control signal of said first switching means in response to said second state output controlling signal; and rectifying portions for rectifying and outputting pulse voltages outputted form respective secondary windings of said first and second transformers, whereby pulse width modulation pulses of a second state are alternatively outputted from said first and second pulse width modulation controllers.

3. A phase difference synchronization controlling circuit as claimed in claim 2, wherein said phase difference synchronization controlling means comprises:

a first resistor having an input terminal and an output terminal, said input terminal of said first resistor for receiving a voltage potential;

a second resistor having a first terminal for receiving a second potential and having a second terminal attached to said output terminal of said first resistor at a first connecting point;

an R-C circuit having a plurality of resistors and a capacitor, said R-C circuit connected to said first and second resistors at said first connecting point and coupled to said output terminal of said first pulse width modulation controller;

a third resistor having an input terminal and an output terminal, said input terminal of said third resistor coupled to said control terminal of said second pulse width modulation controller; and a diode having an input terminal and an output terminal, said input terminal of said diode connected to said output terminal of said third resistor and said output terminal of said diode coupled to said R-C circuit.

4. A phase difference synchronization controlling means as claimed in claim 3, wherein said R-C circuit comprises:

a fourth resistor having an input terminal coupled to said output terminal of said first pulse width modulation controller and an output terminal coupled to said output terminal of said diode;

a fifth resistor having an output terminal and an input terminal, said input terminal coupled to said output terminal of said first pulse width modulation controller; and a capacitor having an input terminal coupled to said output terminal of said fifth resistor and an output terminal coupled to said output terminal of said diode.

5. A switching mode power circuit having an input terminal for receiving a single DC voltage, first and second pulse generating means coupled to said input terminal for generating first and second pulses, respectively, having first and second pulse widths in response to said DC voltage, first generating means coupled between said input terminal and an output terminal of said first pulse generating means for generating a first DC supply voltage according to a switching operation of said first pulse having said first pulse width and second generating means coupled between said input terminal and an output terminal of said second pulse generating means for generating a second DC supply voltage according to a switching operation of said second pulse having said second pulse width, comprising:

a first resistor having an input terminal and an output terminal, said input terminal of said first resistor for receiving a voltage potential;

a second resistor having a first terminal for receiving a second potential and having a second terminal attached to said output terminal of said first resistor at a first connecting point;

an R-C circuit having a plurality of resistors and a capacitor, said R-C circuit connected to said first and second resistors at said first connecting point and coupled to said output terminal of said first pulse generating means;

a third resistor having an input terminal and an output terminal, said input terminal of said third resistor coupled to said control terminal of said second pulse generating means; and a diode having an input terminal and an output terminal, said input terminal of said diode connected to said output terminal of said third resistor and said output terminal of said diode coupled to said R-C circuit.

6. A phase controlling means as claimed in claim 5, wherein said R-C circuit comprises:

a fourth resistor having an input terminal coupled to said output terminal of said first pulse generating means and an output terminal coupled to said output terminal of said diode;

a fifth resistor having an output terminal and an input terminal, said input terminal coupled to said output terminal of said first pulse generating means; and a capacitor having an input terminal coupled to said output terminal of said fifth resistor and an output terminal coupled to said output terminal of said diode.

7. A method of operating two power supplies at a phase difference of 180 degrees, comprising:

providing a direct current supply voltage to a first pulse width modulation controller, a second pulse width modulation controller, primary windings of a first transformer and primary windings of a second transformer;

generating a first pulse of a predetermined frequency from said first pulse width modulation controller and providing said first pulse to a first transistor and to a phase-difference synchronization controlling means;

switching on said first transistor when said first pulse is in a high state to provide current through said primary windings of said first transformer;

switching off said first transformer when said first pulse is in a low state;

generating a second pulse of a predetermined frequency from said second pulse width modulation controller and providing said second pulse to a second transistor;

generating a second state level signal through said phase-difference synchronization controlling means in response to said first pulse when said first pulse is in said high state;

supplying said second pulse to said second transistor according to said second state level signal; and turning on said second transistor in response to said second pulse generated according to said second state level signal, when said first pulse is in a low state, to provide current through said primary windings of said second transistor.

8. The method of claim 7, wherein said step of supplying said second pulse to said second transistor according to said second state level signal further comprises providing said second state level signal at a high state to a terminal of said second pulse width modulation controller.

* * * * *